United States Patent
Alanzo et al.

(10) Patent No.: US 6,518,351 B1
(45) Date of Patent: Feb. 11, 2003

(54) AQUEOUS DISPERSIONS OF URETHANE-ACRYLIC COPOLYMERS AND THEIR USE AS FINISHING AGENTS

(75) Inventors: Vito Alanzo, Milan (IT); Monica Locatelli, Como (IT); Sergio Giordano, Peschiera Borromeo (IT); Giuseppe Li Bassi, Gavirate (IT)

(73) Assignee: Lamberti SPA, Albizzate (IT)

( * ) Notice: Subject to any disclaimer, the term of this patent is extended or adjusted under 35 U.S.C. 154(b) by 93 days.

(21) Appl. No.: 09/873,965

(22) Filed: Jun. 4, 2001

(30) Foreign Application Priority Data

Jun. 8, 2000 (IT) .......................................... VA00A0017

(51) Int. Cl.7 .................................................. C08J 3/03
(52) U.S. Cl. ........................ 524/501; 524/502; 524/544
(58) Field of Search .................................. 524/501, 502, 524/544

(56) References Cited

U.S. PATENT DOCUMENTS 5,164,252 A * 11/1992 Henning et al. ............ 428/245
6,075,003 A * 6/2000 Haq et al. ................... 510/516

* cited by examiner

*Primary Examiner*—David W. Wu
*Assistant Examiner*—William Cheung

(57) ABSTRACT

Disclosed are aqueous dispersions of cationic urethane-acrylic copolymers containing fluorinated acrylic monomers characterized in that the dispersions are obtained by radical polymerization in aqueous dispersion of fluorinated and non-fluorinated acrylic monomers (A) and of vinyl terminated polyurethane-acrylates containing cationic groups (B). The present invention relates to aqueous dispersions of urethane-acrylic copolymers containing fluorinated acrylic monomers and to their use as finishing agents in oleo and water repellent treatment in the textile, leather and paper field and to a procedure for the preparation of the aqueous dispersions of polymers.

7 Claims, No Drawings

AQUEOUS DISPERSIONS OF URETHANE-ACRYLIC COPOLYMERS AND THEIR USE AS FINISHING AGENTS

BACKGROUND OF THE INVENTION

1. Field of the Invention

The present invention relates to aqueous dispersions of urethane-acrylic copolymers containing fluorinated acrylic monomers and to their use as finishing agents of textiles, leather and paper. The present invention particularly relates to the use of the dispersions in oil-repellent and water-repellent treatments.

2. Description of the Prior Art

Aqueous emulsions containing fluorocarbonic resins are widely used as finishing agents in the textile, leather and paper fields, because they impart good characteristics of oil- and water repellency to the substrates treated therewith. Many examples of aqueous emulsions containing fluorocarbonic resins, useful for the treatment of textiles, paper and leather, are described in the prior art literature.

By way of example, U.S. Pat. No. 5,164,252 (US1) describes hydrophobizing and oleophobizing compositions containing physical mixtures of a polymer containing perfluoroalkyl groups and of a cationically modified polyurethane dispersion, but it does not teach how to obtain a copolymer from the mixtures.

U.S. Pat. No. 5,346,949 (US2) describes aqueous emulsions containing fluorinated and non-fluorinated monomers mixed with a water soluble non-urethane cationic polymer which is able to increase the fixing properties of the resin on textiles. The water soluble cationic polymers used in US2 are expensive and not readily commercially available.

In U.S. Pat. No. 5,115,013 (US3), the preparation and the use in the finishing of natural or synthetic materials of aqueous dispersions of polyurethane-acrylate containing from 5 to 30 percent of fluorine, are described. The dispersions are obtained by grafting a mixture of acrylic monomers, some of which containing fluorine, onto non-functionalized cationic polyurethane dispersions.

In EP 98752 (EP1) a process for the preparation of stable aqueous dispersions of oligourethane-acrylate vinyl terminated containing hydrophilic ionizable groups, anionic or cationic, is described.

In EP 183119 (EP2) copolymers of α,β-ethylenically unsaturated monomers, modified with from 5 to 60 percent by weight, extremes included, of an oligourethane containing ionizable groups and α,βunsaturated terminal groups derived from acrylic and methacrylic monomers, are described. In EP2 neither the use of fluorinated monomers nor the use of the copolymers are cited in oil- and water repellent treatment. EP2 also describes the process for the preparation of the compounds. The EP2 process is not suited for the synthesis of the cationic perfluorinated urethane-acrylate copolymers of the present invention due to the poor emulsionability of the fluorinated monomers in the reaction medium.

SUMMARY OF THE INVENTION

On one aspect, the present invention is an aqueous dispersions of cationic urethane-acrylic copolymers containing fluorinated acrylic monomers characterized in that the dispersions are obtained by radical polymerization in aqueous dispersion of fluorinated and non-fluorinated acrylic monomers and of vinyl terminated polyurethane-acrylates containing cationic groups.

In another aspect, the present invention is a process for the radical polymerization in aqueous dispersion of mixtures of fluorinated and non-fluorinated acrylic monomers (A) on vinyl terminated polyurethane-acrylates containing cationic groups (B), characterized by preparing a pre-emulsion of (A) and of an aqueous dispersion of (B) by reducing the size of their particles to a value <0.15 micron; by warming up the pre-emulsion to from 30° to 100° C. and by polymerizing by adding an initiator of radical polymerization.

DETAILED DESCRIPTION OF THE PREFERRED EMBODIMENTS

According to the present invention, a group of fluorinated copolymers has been found, which is different in structure from the copolymers known for the same use and is prepared as a stable water dispersion. The water dispersion can be used as finishing agent in oil- and water-repellent treatment and is surprisingly effective even when used at low concentrations.

It is a main object of the present invention to provide aqueous dispersions of cationic urethane-acrylic copolymers containing fluorinated acrylic monomers obtained by radical polymerization in aqueous dispersion of fluorinated and non-fluorinated acrylic monomers (A) and of vinyl terminated polyurethane-acrylates containing cationic groups in aqueous dispersion (B). It has been found that the product obtained from the reaction of A with B give excellent oil and water repellent effects to the materials treated and finished with it, effects that are surprisingly much better than the ones obtained using A and B in physical mixture.

While not wishing to be bound by any particular theory as to the explanation of the reasons why the product obtained from the reaction of A with B exhibits a better performance in comparison with their physical mixtures, it is supposed that the fact that A and B are covalently bonded permits a better fixation of the active to textiles.

According to a fundamental aspect of the present invention, the amount of fluorinated acrylic monomer, which is the most expensive component of the mixtures normally used to obtain the expected effects, has been successfully decreased, while obtaining similar or better results in comparison with the ones obtained by the use of the separate components.

It is a further object of the present invention the procedure for obtaining the dispersions by radical polymerization of mixtures of fluorinated and non-fluorinated acrylic monomers, on vinyl terminated polyurethane-acrylates containing ionizable cationic groups.

It has now been found that the use of vinyl terminated urethane-acrylic copolymers as a base for the polymerization of fluorinated acrylic monomers permits a notable reduction of the amount of the surfactants that are normally used in polymerization or in the preparation of this kind of emulsions and that reduce the oil- and water repellent effects on textiles in the application step.

The vinyl terminated polyurethane-acrylates containing cationic groups in aqueous dispersion (B) can be obtained following the procedure described in EP 98752. According to EP 98752, aqueous dispersion of the vinyl terminated polyurethane-acrylates can be prepared by reacting, in a first step, an excess of an organic diisocyanate with a mixture of a diol containing ionizable groups and of an essentially linear macroglycol of the polyol-polyester type and/or polyol-polyether type having a molecular weight from 500 to 5,000 in order to obtain a prepolymer containing free isocyanate groups. The prepolymer is then converted into the vinyl terminated polyurethane-acrylate by reaction with a compound having hydroxyl groups able to react with isocyanic groups that has the following formula:

$$CH_2=C(R)-COOX$$

where R is a methyl group or a hydrogen atom and X is a hydroxyalkyl group. The vinyl terminated polyurethane-acrylate is successively salified.

The preparation of the vinyl terminated cationic polyurethane-acrylate and its successive salification can be done using the same molar ratios described in EP 98752. The vinyl terminated polyurethane-acrylate thus obtained has a molecular weight from 2,000 to 50,000.

The utilizable organic diisocyanate of the present invention may be either of the aromatic, or of the aliphatic or of the cycloaliphatic type. Examples of suitable diisocyanates are 4,4'-dicyclohexyl-methanediisocyanate, 1-isocyanate-3-isocyanate-methyl-3,5,5-trimethyl-cyclohexane (or isophoronediisocyanate), 2,2,4-trimethyl-hexamethylene diisocyanate in admixture with the 2,6,4-trimethyl-hexamethylene diisocyanate isomer, 2,4- toluenediisocyanate either alone or in admixture with the 2,6-toluenediisocyanate isomer, and 4,4'-diphenyl-methanediisocyanate, or mixtures thereof.

As ionizable diols, the diols bearing tertiary amine groups, such as methyidiethanolamine, are particularly suitable according to the present invention. The utilizable macroglycols according to the present invention have a molecular weight from 500 to 5,000, preferably from 800 to 3,000, and are polyethers, polyesters or mixtures thereof.

Examples of utilizable polyesters according to the present invention are polyesters prepared by polycondensation of preferably aliphatic acids or anhydrides, having from 4 to 9 carbon atoms, with aliphatic diols having from 2 to 8 carbon atoms.

Examples of utilizable polyethers according to the present invention are the various types of polyethylene glycol, polypropylene glycol and, preferably, the polymerization products of tetrahydrofuran.

As compounds containing hydroxyl groups capable of reacting with the isocyanate groups particularly suitable according to the present invention are the following hydroxy-alkyl-acrylates or methacrylates: 2-hydroxyethyl-, 2-hydroxypropyl-, 3-hydroxypropyl- or 4-hydroxybutyl-acrylate or methacrylate, or mixture thereof.

For purposes of the present invention, the expression "fluorinated and non-fluorinated acrylic monomers", means a mixture of from 40 to 70% by weight of fluorinated acrylic monomers and of from 30 to 60% by weight of non fluorinated acrylic monomers.

Fluorinated acrylic monomers utilizable according to the present invention have the following formula:

$$C_nF_{2n+1}CH_2CH_2OC(O)-C(R)=CH_2$$

wherein R is a methyl group or a hydrogen atom, and n is a number equal or greater than 5, preferably from 5 to 12. Preferably, the fluorinated acrylic monomers utilizable according to the present invention are ethyl acrylates or methacrylates substituted in the 2 position of the ethyl radical by a perfluoropentylic, perfluorooctylic or perfluorododecylic radical, and mixtures thereof.

For the realization of the present invention, fluorinated monomers having the general formula $$C_nF_{2n+1}SO_2N(R')CH_2CH_2OC(O)-C(R)=CH_2$$

can also be used wherein R and R' are an alkyl group or a hydrogen atom.

Examples of non-fluorinated acrylic monomers which can be used with the present invention include: butadiene; isoprene; chloroprene; styrene; α-methylstyrene; p-methylstyrene; vinylic halogenides, e.g., vinyl chloride, vinylidene chloride, vinylidene fluoride; vinylic esters, e.g., vinyl acetate, vinyl propionate or vinyl stearate; esters of acrylic or methacrylic monomers, e.g., methyl acrylate, methyl methacrylate, ethyl acrylate, ethyl methacrylate, propyl acrylate, butyl acrylate, 2-ethylhexyl acrylate or methacrylate, decyl acrylate, lauryl acrylate or methacrylate, stearyl methacrylate, N,N-dimethylaminoethyl methacrylate, 2-hydroxyethyl methacrylate, 2-hydroxypropyl methacrylate or glycidyl methacrylate; acrylamide, methacrylamide, N-methylolacrylamide, acrylonitrile, methacrylonitrile, N-substituted maleic imides, and mixtures thereof.

The ratio between the mixture of fluorinated and non-fluorinated acrylic monomers (A) and the vinyl terminated polyurethane-acrylate containing cationic groups (B) is such that in the resulting copolymer the amount of (B) is from 5 to 50% by weight.

The polymerization in aqueous dispersion of fluorinated and non-fluorinated acrylic monomers onto vinyl terminated polyurethane-acrylate containing cationic groups cannot be carried out with the known techniques of emulsion polymerization, by warming up under traditional stirring, in the presence of a surfactant and of an initiator of polymerization generating free radicals, due to the fact that it is difficult to emulsify the perfluorinated monomers and that the contact between the acrylic monomers and the vinyl terminated polyurethane-acrylate cannot therefore assure the growth of the acrylic chain on the urethane-acrylate. As a consequence, unstable emulsions are obtained by operating following the traditional method.

It has now been found that the polymerization can be carried out by previously preparing a pre-emulsion of the mixture of the fluorinated and non fluorinated acrylic monomers and of an aqueous dispersion containing the vinyl terminated polyurethane-acrylates.

In order to attain the aim of the present invention, it is necessary to prepare stable pre-emulsions by reducing the size of the particles to values lower than 0.15 microns, preferably lower than 0.10 microns.

After having prepared the pre-emulsion it is possible to carry out the polymerization by warming up the pre-emulsion and by adding a solution, or an aqueous dispersion, of a radical polymerization initiator into the pre-emulsion, under stirring. Useful radical polymerization initiators include organic azo-derivatives; organic hydroperoxides or peroxides, such as 2,2'-azobis-(2-methylpropionamidine) dihydrochloride, benzoyl peroxide, di-cumyl peroxide, terbutyl-hydroperoxide, cumene hydroperoxide, p-menthane hydroperoxide; and sodium, potassium or ammonium persulfate, used alone or together with a reducing agent such as sodium metabisulphite or sodium formaldehyde-sulfoxylate. The amount of initiator employable ranges from 0.01 to 1% by weight, preferably from 0.01 to 0.2% by weight, of the total weight of the monomers.

The polymerization temperature may vary from 30° to 100° C., depending on the kind of initiator. The preferred polymerization temperature range is from 40° to 70° C.

The solution containing the polymerization initiator is normally added over a period of one or two hours. Preferably, the reaction is maintained at a temperature in the preferred range until the residual content of acrylic monomers does not exceed 0.1% by weight of the initial amount of acrylic monomers.

Typically, the amount of urethane-acrylic copolymers in the aqueous dispersion useful for the realization of the present invention is from 20 to 30% by weight. This range of concentrations is particularly desirable because it allows for the production of concentrated dispersions while avoiding the transportation of large quantities of water and obtaining lower viscosities with resultant easier applications.

In the most common embodiment of the present invention, the reaction product of A and B is used in the form of an aqueous solution at a concentration of from 0.2 to 3% by weight in the composition used for finishing, preferably of from 0.5 to 2% by weight.

EXAMPLES

The following examples are provided to illustrate the present invention. The examples are not intended to limit the scope of the present invention and they should not be so interpreted. Amounts are in weight parts or weight percentages unless otherwise indicated.

Vinyl Terminated Polyurethane-acrylate Dispersion Preparation

The vinyl terminated polyurethane-acrylate dispersion used in in the following examples, hereafter Polyurethane P, is prepared as follows.

Into a reactor equipped with stirrer, thermometer, reflux cooler, under nitrogen, 192.0 g of polytetrahydrofuran (1,000 M.W.), 20.0 g of methyldiethanolamine and 0.046 g of benzoyl chloride are charged; then, under stirring, 45.4 g of hexamethylene diisocyanate and 70.7 g of 4,4'-dicyclohexyl-methane diisocyanate are added.

The reaction mixture is set at 90° C. and this temperature is maintained until the —NCO content reaches 2.5%. After cooling down to 75° C. the atmosphere was changed from nitrogen to air and 16.9 g of N-methylpyrrolidone and 9.4 g of hydroxypropyl acrylate are added. After 2 hours the prepolymer is diluted with acetone. At 50° C., 23.1 g of a 70% aqueous solution of methanesulfonic acid is added, taking care to maintain the temperature below 60° C., then 665.4 g of demineralized water are added under vigorous stirring. Acetone is than removed by vacuum distillation to obtain a translucent dispersion with a solid content of 30%.

Preparation of Solution 2

For the application tests, an aqueous solution is prepared by mixing 2.76 g of Polyurethane P, 9.24 g of the dispersion obtained as described in Comparative Example 2 and 188 g of water (Solution 2).

Example 1

120.0 g of Polyurethane P are mixed with 45.0 g of β-(perfluorooctyl)ethyl acrylate (Foralkyl® AC/8N—Elf Atochem), 20.8 g of a 48% aqueous solution of methylolacrylamide, 30.0 g of methylmethacrylate, 6.0 g of Rolquat® S/35, 2.0 g of polyoxyethylene (30) nonylphenol, 2.0 g of polyoxyethylene (4) nonylphenol, 30.0 g of dipropylene glycol monomethylether, 3.0 g of 1-dodecanethiol and 208.2 g of demineralized water.

The mixture thus obtained is intimately emulsified using an Ultraturrax-T50 (Janke e Kunkel—IKA Labortechnik) apparatus for 5 minutes at 10,000 rpm to obtain a stable pre-emulsion with particles having a size of 0.08 micron.

The pre-emulsion thus obtained is transferred into a reactor equipped with an anchor stirrer, thermometer and reflux cooler. The temperature is set at 60° C. and, under nitrogen atmosphere during 2 hours, a solution obtained by dissolving 1.0 g of 2,2'-azo-bis-(2-methylpropionamidine) dihydrochloride (97%) in 50.0 g of demineralized water is added dropwise. A stable aqueous dispersion is thus obtained with a solid content of 25% and pH 4.8.

Preparation of Solution 3

For the application tests, an aqueous solution of the thus obtained dispersion is prepared, by mixing 12 g of the dispersion prepared in Example 1 with 188 g of water (Solution 3).

Comparative Example 2

45.0 g di β-(perfluorooctyl)ethyl acrylate (Foralkyl® AC/8N—Elf Atochem) are mixed with 20.83 g of a 48% aqueous solution of methylolacrylamide, 30.0 g of methylmethacrylate, 6.0 g of Rolquat® S/35, 2.0 g of polyoxyethylene (30) nonylphenol, 2.0 g of polyoxyethylene (4) nonylphenol, 30.0 g of dipropyleneglycol monomethylether, 3.0 g of 1-dodecanethiol and 184.2 g of demineralized water. The mixture thus obtained is intimately emulsified using an Ultraturrax-T50 (Janke e Kunkel—IKA Labortechnik) apparatus for 5 minutes at 10,000 rpm to obtain a stable pre-emulsion with particles having a size of 0.08 micron.

The pre-emulsion thus obtained is transferred into a reactor equipped with an anchor stirrer, thermometer and reflux cooler. The temperature is set at 60° C. and under nitrogen atmosphere during 2 hours a solution obtained by dissolving 1.0 g of 2,2'-azo-bis-(2-methylpropionamidine) dihydrochloride (97%) in 50.0 g of demineralized water is added dropwise. A stable aqueous dispersion is thus obtained with a solid content of 25% and pH 5.3.

Preparation of Solution 1

For the application tests, an aqueous solution of the thus obtained aqueous dispersion is prepared, by mixing 12 g of the dispersion prepared in Comparative Example 2 with 188 g of water (Solution 1).

Application Tests

Preparation of the samples:

The three solutions prepared as described above (Solution 1, Solution 2 and Solution 3) are used.

The three solution have a solid content of 1.5% by weight and are used as such concentration on cotton, polyester, and polyamide for foulard application, with pick-up values respectively of 70%, 50%, 50%. The textile samples finished with each solution are then dried at 120° C. for 1 minute and then heated at 160° C. for 1 minute. After a 3 hours at ambient conditions, the following tests are performed:
1) Water Repellency Test.

The textile samples are tested in accordance with the AATCC-22 (Spray Test) Test Method. In this method, 250 ml of demineralized water are poured on the textile sample and the water repellency values are evaluated according to the following values:

| 100 | Dry surface |
|---|---|
| 90 | The surface is wetted by some drops |
| 80 | The surface is wetted by many drops |

| | |
|---|---|
| 70 | The surface is partially wetted |
| 50 | The surface is completely wetted |
| 0 | Water penetrates the sample |

Oil Repellency Test.

The textile samples are tested and evaluated according to values from 1 to 6, by using the following substances, according to AATCC-118 test method:

| | |
|---|---|
| 1 | Nujol |
| 2 | 65:35 - Nujol:n-hexadecane |
| 3 | n-hexadecane |
| 4 | n-tetradecane |
| 5 | n-dodecane |
| 6 | n-decane |

The water and oil repellency values obtained in the application tests carried out according to AATCC-22 e AATCC-118 test methods on textile samples finished with the three Solution 1, 2 and 3 are reported in Table 1.

TABLE 1

| | Solution 1* | | Solution 2* | | Solution 3 | |
|---|---|---|---|---|---|---|
| | AATCC 22 | AATCC 118 | AATCC 22 | AATCC 118 | AATCC 22 | AATCC 118 |
| COTTON | 50 | 4 | 70/80 | 5 | 90/100 | 6 |
| POLYESTER | 50/70 | 4 | 80 | 5 | 100 | 6 |
| POLYAMIDE | 90/100 | 4/5 | 90/100 | 5 | 100 | 6 |

*Not an example of the present invention.

What is claimed is:

1. Aqueous dispersions of cationic urethane-acrylic copolymers containing fluorinated acrylic monomers wherein the dispersions are obtained by radical polymerization in aqueous dispersion of fluorinated and non-fluorinated acrylic monomers (A) and of vinyl terminated polyurethane-acrylates containing cationic groups (B).

2. The aqueous dispersions according to claim 1 wherein the fluorinated and non-fluorinated acrylic monomers (A) consist of a mixture of from 40 to 70% by weight of fluorinated acrylic monomers and of from 30 to 60% by weight of non fluorinated acrylic monomers.

3. The aqueous dispersions according to claim 2 wherein the fluorinated acrylic monomers have the following formula:

$$C_nF_{2n+1}CH_2CH_2OC(O)-C(R)=CH_2$$

Wherein:

R is a methyl group or a hydrogen atom, and n is a number equal or greater than 5.

4. Aqueous dispersions according to claim 3 wherein n is a number from 5 to 12.

5. Aqueous dispersions according to claim 2 wherein the fluorinated acrylic monomers have the following formula:

$$C_nF_{2n+1}SO_2N(R')CH_2CH_2OC(O)-C(R)=CH_2$$

wherein:

R and R' are an alkyl group or a hydrogen atom.

6. Aqueous dispersions according to claim 1 wherein the vinyl terminated polyurethane-acrylates containing cationic groups (B) have a molecular eight from 2,000 to 50,000.

7. Aqueous dispersions according to claim 1 wherein fact that they contain from 20 to 30% by weight of the cationic urethane-acrylic copolymers.

* * * * *